(12) United States Patent
Dutta et al.

(10) Patent No.: US 7,599,760 B2
(45) Date of Patent: Oct. 6, 2009

(54) ONLINE CONFIGURABLE CONTROL SYSTEM FOR FUEL CELLS

(75) Inventors: Abhijit Dutta, Mountain View, CA (US); Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 162 days.

(21) Appl. No.: 11/404,760

(22) Filed: Apr. 17, 2006

(65) Prior Publication Data
US 2007/0243435 A1    Oct. 18, 2007

(51) Int. Cl.
G05D 3/12 (2006.01)
G05B 11/01 (2006.01)
G05B 15/00 (2006.01)
G05B 9/02 (2006.01)
H01M 8/00 (2006.01)
H01M 8/04 (2006.01)
G06F 17/00 (2006.01)

(52) U.S. Cl. .......................... 700/287; 700/12; 700/15; 700/18; 700/26; 700/75; 700/79; 700/275; 700/292; 429/13; 429/22; 715/212; 715/961

(58) Field of Classification Search .................. 700/11, 700/12, 15, 17, 18, 23, 25, 26, 27, 75–77, 700/79, 275, 287, 292–294; 429/12, 13, 429/22–25; 702/180–185; 715/212, 961, 715/965

See application file for complete search history.

(56) References Cited

U.S. PATENT DOCUMENTS 5,485,600 A * 1/1996 Joseph et al. .................. 703/13

6,376,111 B1    4/2002 Mathias et al.

(Continued)

FOREIGN PATENT DOCUMENTS

EP    1 501 146 A2    1/2005

(Continued)

OTHER PUBLICATIONS

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.

(Continued)

Primary Examiner—Sean P Shechtman
(74) Attorney, Agent, or Firm—Foley & Lardner LLP (57) ABSTRACT

A fuel cell system control system includes a fuel cell system and a controller. The controller includes a display and a processor configured to execute a program for managing an operation of a fuel cell state machine having a plurality of states and capable of executing logic to execute state transitions, and a fuel cell failure detection and correction program, configured to detect one or more fuel cell system failures and correct each detected failure while the fuel cell system continues to operate. The control process includes the steps of representing an operation of a fuel cell control system as a state machine having one or more states, controlling the operation of the fuel cell system using the state machine, executing one or more states of the state machine, and correcting operational errors in the fuel cell control system while the fuel cell system continues to operate.

4 Claims, 6 Drawing Sheets

U.S. PATENT DOCUMENTS

| | | |
|---|---|---|
| 6,383,670 B1 | 5/2002 | Edlund et al. |
| 6,389,558 B1 * | 5/2002 | Herrmann et al. ............. 714/39 |
| 6,833,205 B2 * | 12/2004 | Speranza et al. ............. 429/13 |
| 6,924,053 B2 | 8/2005 | McElroy |
| 7,362,557 B2 * | 4/2008 | Soudier et al. ............. 361/93.8 |
| 2002/0192516 A1 | 12/2002 | Tajima |
| 2004/0081867 A1 | 4/2004 | Edlund |
| 2004/0202914 A1 | 10/2004 | Sridhar et al. |
| 2004/0217732 A1 | 11/2004 | Zhu et al. |
| 2005/0048336 A1 | 3/2005 | Takebe et al. |
| 2005/0164051 A1 | 7/2005 | Venkataraman et al. |

FOREIGN PATENT DOCUMENTS

WO    WO 2004/092756 A1    10/2004

OTHER PUBLICATIONS

Hamburger, R. O., et al., "LabView DSC Automates Fuel Cell Catalyst Research", Nov. 4, 2004, http://web.archive.org/web/20041104200039/http://bloomy.com/newsletters/fuelcellresearch.pdf.

* cited by examiner

| Column 1 | Column 2 | Column 3 | Column 4 | Column 5 |
|---|---|---|---|---|
| ACTIVE/IGNORE | COMMAND | <parameter/variable> | IF COMMAND | <parameter/variable> |
| ACTIVE/IGNORE | COMMAND | <parameter/variable> | IF COMMAND | <parameter/variable> |

US 7,599,760 B2

ONLINE CONFIGURABLE CONTROL SYSTEM FOR FUEL CELLS

BACKGROUND OF THE INVENTION

The present invention relates generally to the field of fuel cells, such as solid oxide fuel cells ("SOFC"). Specifically, the present invention relates to a control system for a fuel cell system and the programming language for the control system.

Fuel cells convert the chemical energy of fuels directly into electrical energy. A SOFC system is a desirable fuel cell system for generating electricity from hydrocarbon fuels. In SOFC's the electrolyte is a solid oxide ceramic material. Oxygen ions are transferred from the cathode side through the solid oxide electrolyte material at high temperature to react with hydrogen on the anode side.

Generally, the complex processes carried out by a SOFC system are managed by a control system. Its primary function is to control the functions of a SOFC system in all phases of its operation. Conventional control systems for SOFC systems generally include some form of basic error protection. When the SOFC control system detects an error during operation, the SOFC system is powered down. Once powered down, operators may then troubleshoot the system to discover what caused the error.

In addition, operators of SOFC systems may wish to reconfigure how the SOFC system operates. Generally, in order to reconfigure a SOFC system's operating parameters, the control system logic must be modified. In conventional systems, this modification may only take place when the SOFC system is not operating. An interruption to system operation may result in severe degradation of system performance and an interruption of electricity generation.

SUMMARY OF THE INVENTION

According to one embodiment of the invention, a fuel cell system control system comprises a fuel cell system and a controller, comprising a display and a processor configured to execute a control program for managing an operation of a fuel cell state machine having a plurality of operational states and capable of executing conditional logic to execute state transitions; and a fuel cell failure detection and correction program, configured to detect one or more fuel cell system failures and execute a corrective procedure for each detected failure while the fuel cell system continues to operate.

According to another embodiment of the invention, a method for controlling a fuel cell system comprises representing an operation of a fuel cell control system as a state machine having one or more states; controlling the operation of the fuel cell system using the state machine; executing one or more states of the state machine; and correcting operational errors in the fuel cell control system while the fuel cell system continues to operate.

According to still another embodiment of the invention, a method for configuring a fuel cell control system comprises providing a fuel cell system; providing a computer configured to execute a control program that operates the fuel cell system; operating the fuel cell system to generate electricity; and updating the control program while the fuel cell system continues to generate electricity.

According to yet another embodiment of the invention, a fuel cell system control system comprises a computer configured to execute a control program, having source code, that operates the fuel cell system, wherein the source code is in the form of a spreadsheet file.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 1:
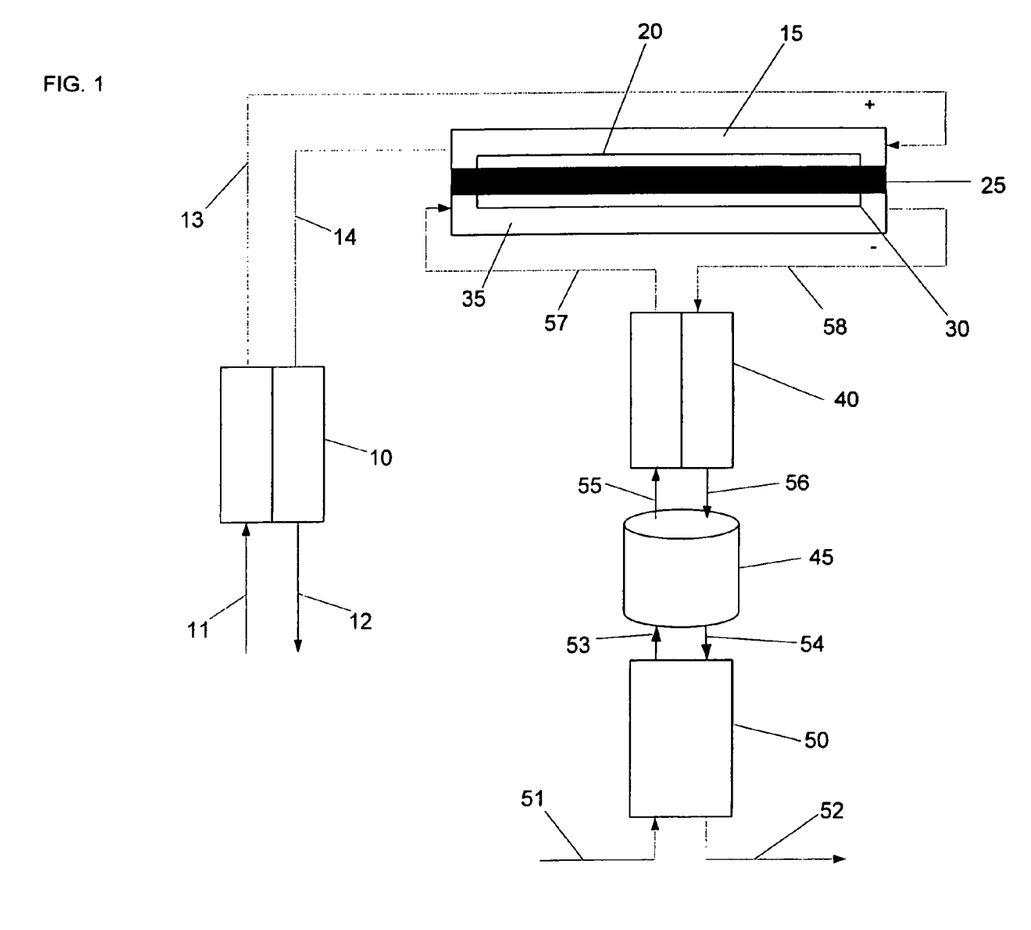
FIG. 1 is a schematic of a SOFC system according to one embodiment of the present invention.

FIG. 1 shows a schematic of a solid oxide fuel cell system 1. It should be understood that the invention is not limited to solid oxide fuel cell systems. The control system of the present invention may be used with any fuel cell types such as PEM fuel cells, molten carbonate fuel cells, etc. The system includes an optional air heat exchanger 10, a cathode chamber 15, a cathode electrode 20, a ceramic electrolyte 25, an anode electrode 30 and an anode chamber 35. While one fuel cell is shown in FIG. 1 for clarity, it should be understood that the SOFC system 1 contains one or more stacks of fuel cells. The SOFC system 1 further includes an optional fuel heat exchanger 40, an optional water vapor and enthalpy recovery unit 45 and an optional hydrogen recovery unit 50. Conduits 51, 53, 55 and 57 are fuel supply inlet conduits. Accordingly, conduits 52, 54, 56 and 58 are fuel exhaust conduits.

The SOFC system 1 contains an optional hydrogen recovery unit 50 which transfers hydrogen gas from within a gas mixture into a secondary gas stream. The hydrogen recovery unit 50 may be any suitable selective hydrogen recovery device. Unit 50 can be a device based on an electrochemical proton exchange process (i.e., an electrochemical proton exchange pump), such as a polymeric or ceramic proton exchange membrane, or a device which uses pressure swing adsorption for selective hydrogen recovery. The SOFC system 1 contains an optional water vapor and enthalpy recovery unit 45. The water vapor and enthalpy recovery unit 45 may be any device which selectively transfers water vapor from one gas stream to a secondary gas stream. The water vapor and enthalpy recovery unit 45 may be a device which contains a rotating desiccant wheel (also known as an enthalpy wheel) or cyclic desiccant beds. The rate of rotation of the desiccant wheel controls the amount of water vapor transferred by the device. Heat exchanger 40 can be counter flow gas-gas heat exchanger.

The units 50 and 45 are operatively connected to the fuel supply inlet conduit and to the fuel exhaust outlet conduit. Thus, the units 50 and 45 are either directly connected to the inlet and outlet conduits or indirectly connected to the inlet and outlet conduits by respective water and hydrogen delivery conduits. A method of operating the system 1 is described below.

Air containing reactant oxygen is delivered by a blower (not shown) to the cathode heat exchanger 10 through conduit 11. Within the cathode heat exchanger 10 fuel cell waste heat is exchanged into the cathode inlet air raising the air temperature closer to the cell operating temperature. The heated air is then delivered to the cathode chamber 15 through conduit 13. Within the cathode chamber 15, the oxygen gas within the air contacts the cathode electrode 20 and generates oxygen ions. The oxygen ions pass through the solid oxide electrolyte 25 and are made available on the anode electrode 30 to oxidize available fuel.

As the air flows through the cathode chamber 15 the air is partly depleted of oxygen and its temperature is increased from the waste heat generated within the fuel cell. The cathode air from cathode chamber 15 is directed back to the cathode heat exchanger 10 through conduit 14. Within heat exchanger 10, heat is transferred from the exhaust air stream to the air inlet stream in a counter flow arrangement. The cooled exhaust air is then discharged from heat exchanger 10 through conduit 12.

A fuel, such as methane or natural gas and/or another suitable hydrocarbon or hydrogen fuel, is introduced into the SOFC system 1 through conduit 51 into hydrogen recovery unit 50. The fuel may be located in a fuel storage vessel, such as a methane storage vessel, connected to conduit 51. Within hydrogen recovery unit 50, hydrogen gas is transferred from the outlet stream (i.e., the fuel exhaust stream) into the hydrocarbon fuel inlet stream. This hydrogen supports a uniform methane reformation process within the anode catalyst 30 for an internal reforming cells. The methane and hydrogen mixture (i.e., the fuel inlet stream) flows from the hydrogen recovery unit 50 into the enthalpy recovery unit 45 through conduit 53. For external reforming cells, the hydrocarbon fuel is reformed to a hydrogen containing fuel in an external reformer.

Within the water vapor and enthalpy recovery unit 45, a portion of the water vapor is transferred from the exhaust or outlet stream into the fuel inlet stream. From the water vapor and enthalpy recovery unit 45, the methane, hydrogen and water vapor mixture (i.e., the inlet stream) is introduced into the fuel heat exchanger 40 through conduit 55. In the heat exchanger 40, the gas mixture temperature is increased near to the operational temperature of about 600° to 1000° C., such as 800° C., using the high temperature waste heat from the fuel exhaust stream. From heat exchanger 40, the hot mixture of methane, hydrogen, and water vapor (i.e., the inlet stream) is delivered to the anode chamber 35 through conduit 57. Some steam reformation of the methane will occur in the heat exchanger 40 and conduit 57, but the amount is suppressed by the existence of the hydrogen. For internal reforming cells, the completion of the steam reforming of the methane is accomplished in the anode catalyst 30.

Within the anode electrode catalyst 30, the steam reforming of methane and the oxidation of carbon and hydrogen in the fuel cell reactions convert the discharged gas mixture to carbon dioxide, additional water vapor, and excess hydrogen. The discharged gas mixture (i.e., the exhaust or outlet stream) flows to heat exchanger 40 through conduit 58, releasing waste heat. The discharged gas mixture (i.e., the exhaust or outlet stream) then flows through conduit 56 to the enthalpy recovery unit 45 to supply a portion of the water vapor to support the input methane reformation. The discharged gas mixture (i.e., the exhaust stream) is then directed to the hydrogen recovery unit 50 through conduit 54, where a selected amount of the hydrogen is transferred to the methane inlet stream. Preferably, the hydrogen recovery unit 50 is located separately from the water vapor and enthalpy recovery unit 45 and the hydrogen recovery unit is located further downstream from the water vapor and enthalpy recovery unit relative to the solid oxide fuel cell stack, such that hydrogen is introduced into the fuel inlet stream before water vapor. The exhaust stream from hydrogen recovery unit 50, containing mostly carbon dioxide, water, and a small quantity of non-reacted fuel, is discharged from the SOFC system 1 through conduit 52.

Figure 2:
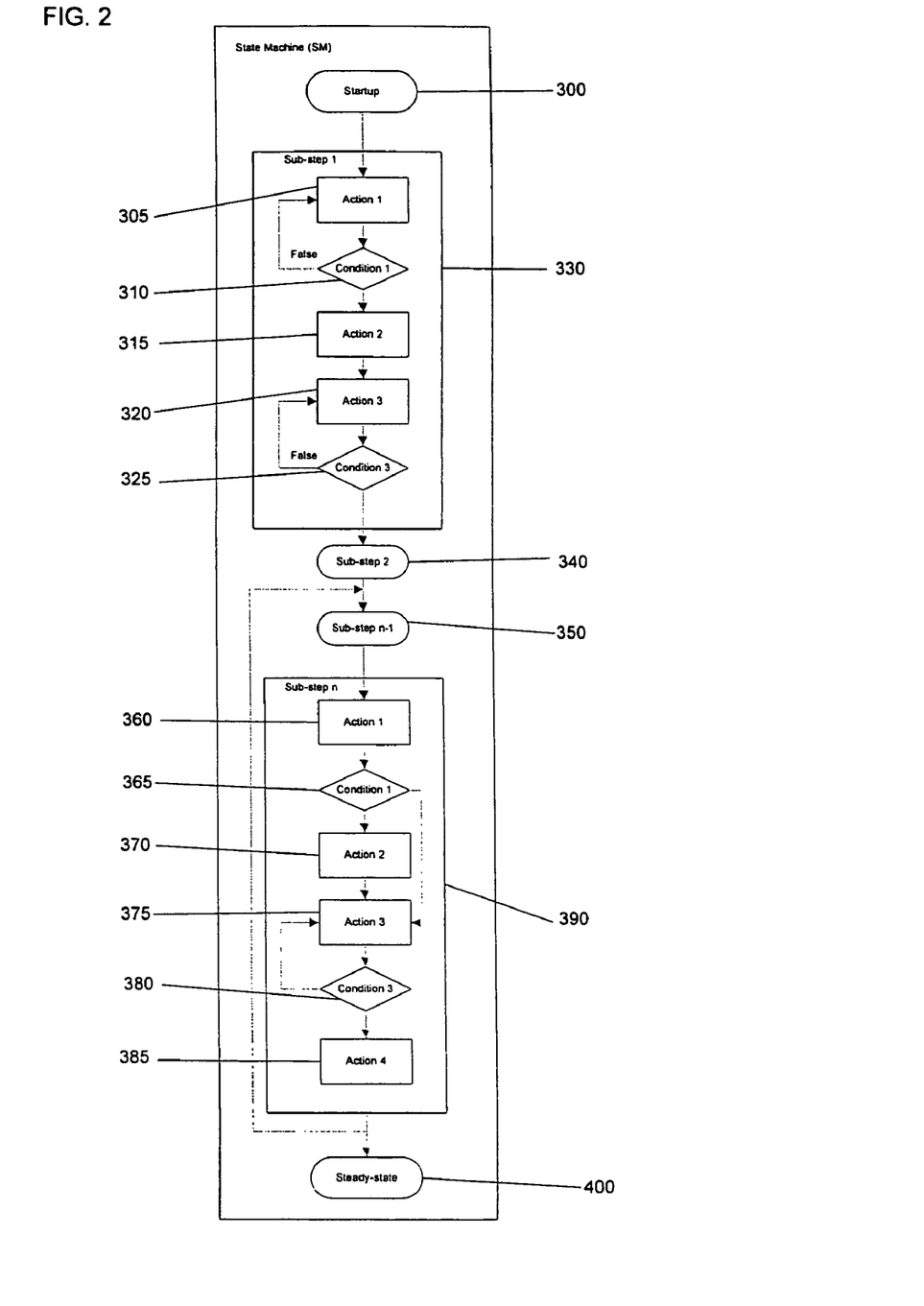
FIG. 2 is a flowchart of automated SOFC control program for a SOFC control system or state machine according to one embodiment of the present invention.

FIG. 2 is a flow diagram for the fuel cell control system which comprises an automated control program or state machine system. The control program for the fuel cell system 1 is represented and implemented as a state machine using modular sub-steps. Each modular sub-step represents a unique step in the fuel cell system 1 operation.

In addition to stepping through the control system in a normal operational manner, the state machine has the capability to jump to various sub-steps in the fuel cell system operation. In other words, the fuel cell system control system may be manipulated to switch between one or more modes of operation of the fuel cell system or one or more sub-states within a mode. This allows the SOFC system to adapt to unpredictable behavior and possibly bypass an operational step if so desired. The fuel cell control program or state machine will now be described in further detail with reference to FIG. 2.

Figure 3:
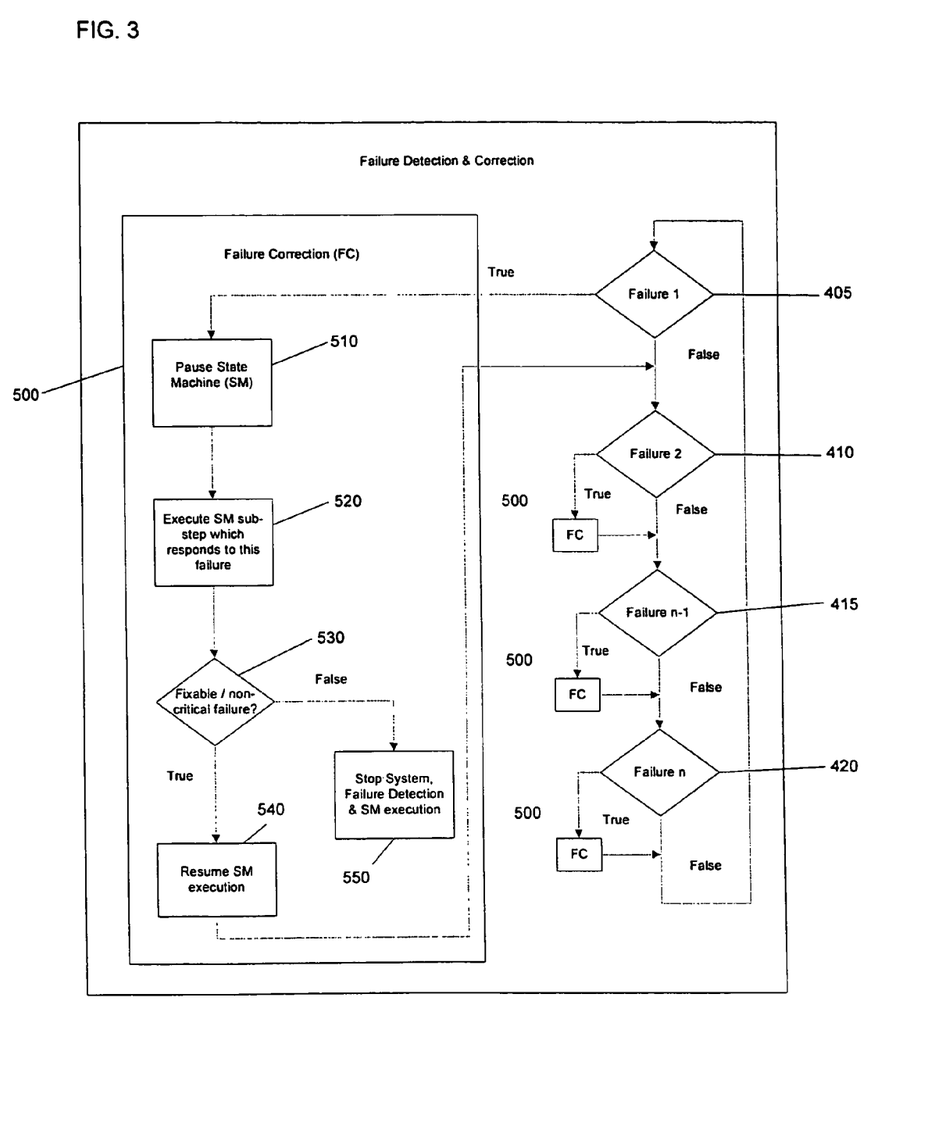
FIG. 3 is a flowchart of a failure detection and correction program for a SOFC control system according to one embodiment of the invention.

Upon startup 300, the state machine steps from one sub-step to another as certain conditions are satisfied in the logic within each sub-step. The state machine progresses through each sub-step until a steady-state operating condition 400 is achieved. FIG. 2 shows four intermediate sub-steps 330, 340, 350, 390. It should be understood that FIG. 3 is exemplary only and that the fuel system operation may be represented by various steps. In addition, similar sub-steps may exist for the transition between other fuel cell operation modes such as steady state operational mode to controlled shut-down state and/or a steady state operational mode to an emergency shut-down mode.

Sub-step 1 (330) begins with a process or Action 1 (Step 305). An action may be one of several processes executed by the fuel cell system as detailed above. The control system then determines whether a Condition 1 is true (Step 310). If Condition 1 is true then the control system performs Action 2 (Step 315). If Condition 1 is false then Action 1 is repeated (Step 305). Specifically in this embodiment, Action 1 is repeated until Condition 1 is true. After Action 2 is executed, the fuel cell control program instructs the fuel cell system 1 to execute Action 3 (Step 320). As shown in FIG. 2, the fuel cell control system proceeds to execute Sub-step 2 (340) if Condition 3 (325) is true. If Condition 3 is false then the fuel cell control system repeats Action 3. Specifically, in this embodiment, Action 3 is repeated until Condition 3 is true.

Once condition 3 is true, the control system program proceeds to Sub-step 2 (340). Sub-step 2 may be a sub-step similar to Sub-step 1 or may be different. The actions which are carried out in Sub-step 2 and Sub-step n-1 (350) will depend in large part to the operational characteristics of the SOFC.

Sub-step n illustrates a slight variation upon the logic carried out in Sub-step 1. First, after Action 1 (360) is executed, the control system program determines if Condition 1 is true. If Condition 1 (365) is true, the control system program proceeds to Action 2 (Step 370). If Condition 1 (365) is false the control system program proceeds to Action 3, bypassing Action 2 entirely (Step 375). Next, if Condition 3 (380) is false, Action 3 is repeated. In the alternative, if Condition 3 is true, Action 4 is executed (Step 385). According to this embodiment of the invention, after Sub-step n (390) the control program is configured so that SOFC reaches a steady state (400).

The control system program described above also allows for manual overrides so the user can interrupt the state machine and jump to different sub-steps. This ability to skip actions within a sub-step or to resume operation at any juncture is a useful feature for debugging newly added fuel cell control system logic.

The failure detection and correction aspect of the control system will now be described with reference to FIG. 3. As shown in FIG. 3, the SOFC control system is configured to detect failure conditions during the operation of the SOFC. Generally, these failure conditions are predetermined and depend on various operating parameters of the SOFC. However, according to one embodiment of the invention, the failure conditions can be determined and modified during operation of the SOFC system 1. The failure detection and correction program runs independently of the fuel cell state machine implementation at a high frequency in order to detect errors or failures.

FIG. 3 is a flowchart of operations carried out by the SOFC control system when a failure is detected. For example, if a Failure 1 is detected by the control system in step 405, a Failure Correction procedure 500 is executed. As shown in FIG. 3, once a failure is detected the state machine operation illustrated in FIG. 2 is paused (Step 510). Although, the state machine execution is paused the fuel cell system continues to operate, generate electricity and is not shut down. Then in step 520, a state machine sub-step that is specifically responsive to the type of failure identified in step 405 is executed. Upon execution, the control system determines whether the identified failure (405) is a non-critical failure that can be fixed by the execution of the sub-step 520 (Step 530). For example, according to one embodiment of the invention a non-critical failure may be a system temperature exceeding a preset threshold. The sub-step 520 may correct this failure by executing steps to lower the temperature below the threshold. If the identified failure 405 is repaired by the sub-step execution 520 then the control system resumes execution of the state machine control logic (Step 540). The repaired state of the fuel cell system allows resumption of regular control logic. In the alternative, if the identified failure 405 is not repairable, the fuel cell system is shutdown to allow for further troubleshooting and diagnostic tests (Step 550). For example, according to one embodiment of the invention, a critical failure may be a mechanical failure. Generally, mechanical failures in fuel cell systems require hands-on maintenance. Such maintenance requires that the fuel cell system be powered down. These steps for failure correction 500 may be carried out for any number of failures as shown in FIG. 3.

Now with reference to FIGS. 4 and 5, a method for dynamically modifying the control system program of the fuel cell control system will now be described. According to one embodiment of the invention, the programming code used to implement the fuel cell control system is written and edited in a conventional spreadsheet application. For example, the programming code may be written and edited using Microsoft Excel™. Using a spreadsheet application such as Microsoft Excel™ enables a user of the fuel cell control system to easily modify and change the program code. Preferably, the program code is stored in a spreadsheet file 610 on a computer 600. This spreadsheet file 610 is then downloaded to a SOFC control system 620.

Figure 4:
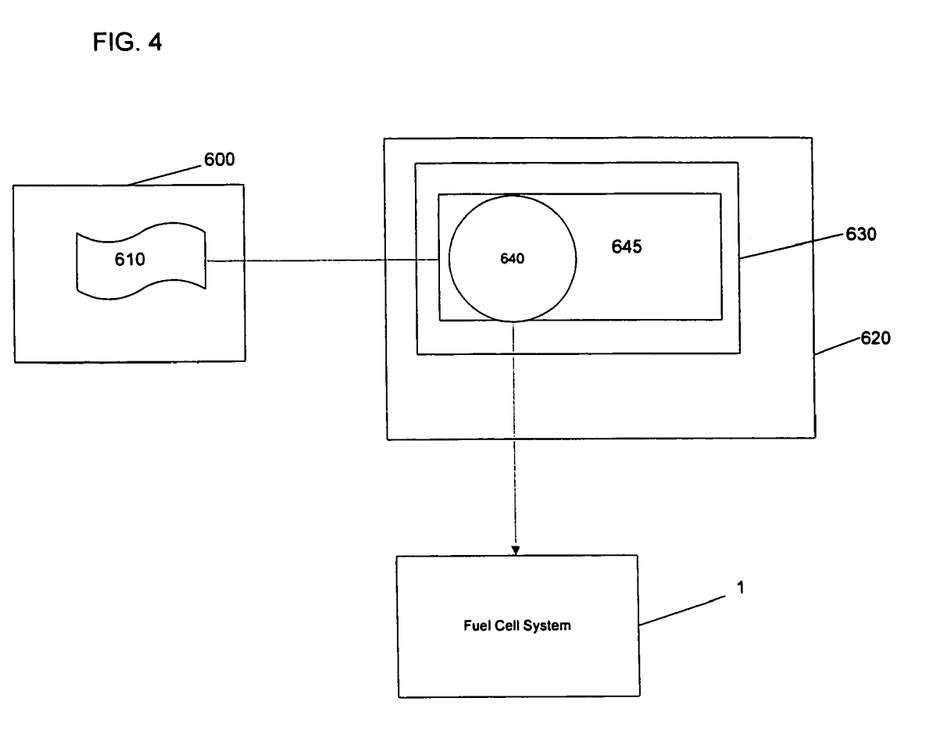
FIG. 4 is a block diagram of a fuel cell control system architecture according to one embodiment of the present invention.
Figure 5:
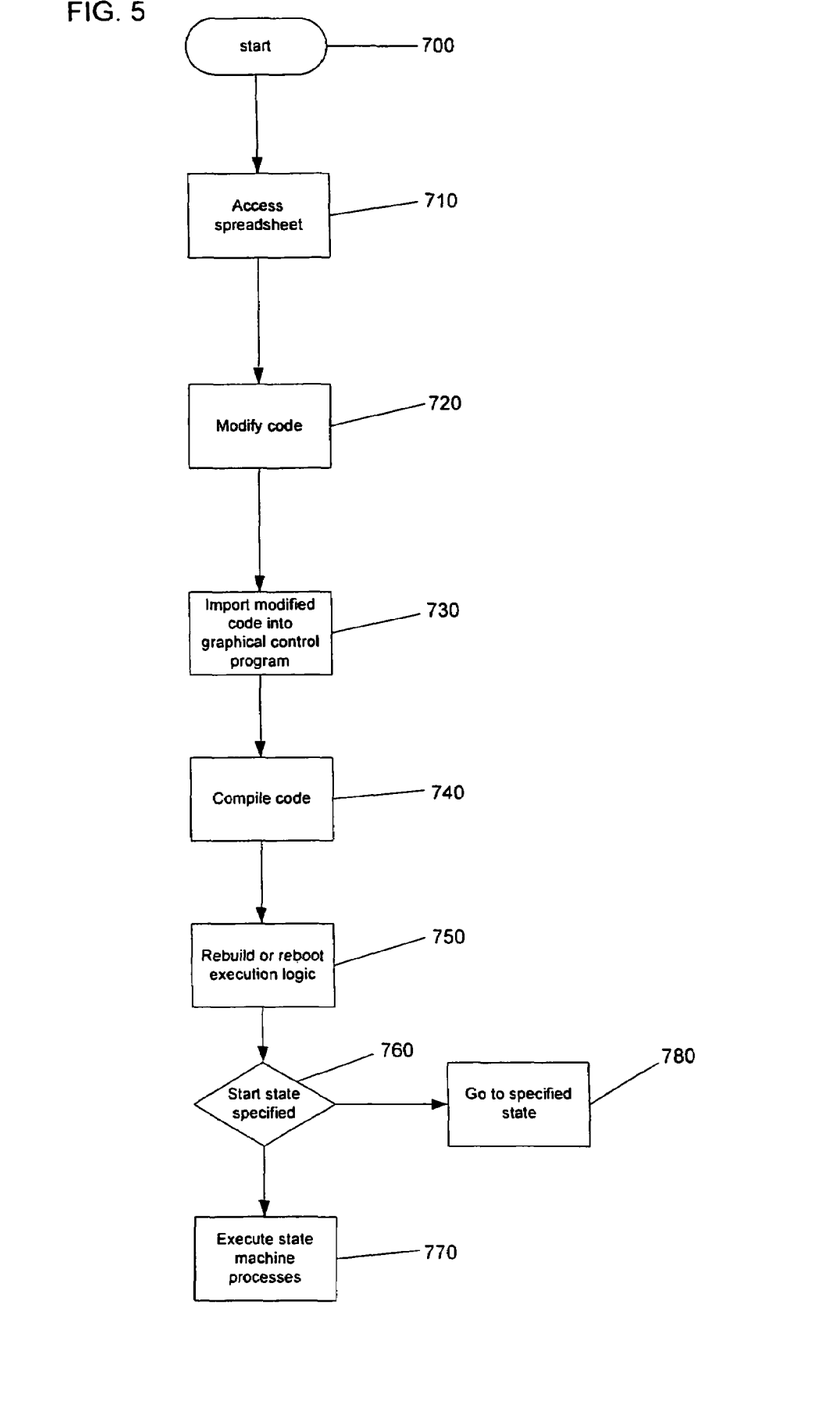
FIG. 5 is a flowchart of a method for dynamically configuring the control program while the SOFC system is still running according to one embodiment of the invention.

According to one embodiment of the invention and as shown in FIG. 4, the fuel cell control system 620 consists of a controller 630 capable of running a control program 640. For example, the controller 630 may be a CPU or a personal computer or a workstation. According to one embodiment of the invention, the spreadsheet file 610 is stored and the control program 640 is run on a single computer. In the alternative, the control program 640 can be accessed remotely via TCP/IP or other known communications protocols. The control program 640 compiles the program code in the spreadsheet file 610 and sends operation instructions to the fuel cell system 1. Preferably the control program 640 is graphical programming application. Graphical programming applications are effective software used for such functions as data acquisition and instrument control. For example, the graphical programming application 640 may be the well known and widely used LabVIEW™ program. The execution of the graphical programming application 640 is displayed on a display 645. The fuel cell system 1 carries out its operational functions based on the instructions contained in the compiled spreadsheet file 610.

Several functions are available to a user via the graphical programming application 640 for the fuel cell control system 620. For example, using the graphical programming application 640 the user can pause execution of the control logic for the fuel cell control system 620. Further, the user may use the graphical programming application 640 to specify a new sub-state within the state machine to begin execution of the control logic. Moreover a user may use the graphical programming application 640 to debug the control logic. For example, via the graphical programming application 640, a user can step through each command in the control logic and observe the result of each action. In the alternative, a user can skip steps that they do not wish to test. Finally, while in debug mode, the graphical programming application 640 allows the user to resume operation of the control logic whenever they desire.

A method for modifying the operational function of a fuel cell system 1 without shutting down the fuel cell system shall now be discussed with reference to FIG. 5. First, while the fuel cell system 1 is running, a user accesses the spreadsheet file 610 that contains the instructions currently being used by the operational fuel cell 1 (Step 710). Then, according to step 720, the programming code in the spreadsheet file 610 is modified. These modifications may consist of any conceivable modification to the operation of the fuel cell system 1 including the modification of operational parameters of the fuel cell system. For example, the modifications may increase a temperature threshold in order to change the overall operation of the fuel cell. In addition, the modifications may change the sequence in which some valves are operated to change the overall operation of the fuel cell.

Once a user has completed modifications to the spreadsheet file 610, the file is imported into the control program 640 (Step 730). As shown in step 740, the spreadsheet file 610 is then compiled by the control program 640. Upon compilation, the control program rebuilds the current execution logic being used to operate the fuel cell system 1 to reflect any changes. Upon compilation, the next sub-step executed by the fuel cell system 1 is that of the newly compiled logic. If the newly compiled logic specified a start state upon compilation (Step 760) then the fuel cell control system 620 operation begins execution at the specified state (Step 780). Otherwise, the fuel cell control system 620 operation executes the next state machine process designated by the newly compiled control program without stopping the operation of the fuel cell 1. Further, the fuel cell control system 620 allows a user to pick a new start state of their choice at a later time, provided jumping to the user selected state is physically feasible during the operation of the fuel cell system 1. This architecture gives a user the ability to change the fuel cell system parameters and logic according to detected operational parameters, system failures, user or customer requirements, etc.

The programming language used for implementing the fuel cell control system 620 will now be described in further detail. The programming language allows for all fundamental operations required to run an automated control system using a sequence of state changes. The programming language can be used to implement function calls, loops and other features available in high level languages. The programming language also includes several commands specific to fuel cell control systems 620.

Preferably, the programming language is written using a spreadsheet program instead of a conventional text editor. For example, the programming code may be written in Microsoft Excel™. Creating programming code in a spreadsheet program allows for easier error checking specifically for identifying syntax errors which can be a common programming error. Specifically, features within Excel such as validity checking and special code in Visual Basic can be written to complete syntax checking and be extended to make the language graphically programmable.

Further, the programming language can be expanded and the programming language compiler can be modified to recognize new keywords and or parameters a user desires to add. The programming language is modular and its execution can be directed to any sub-step or any Action or Condition. Nested function calls as well as recursion is allowed.

The programming language uses defined tags to access system variables. This insures tight integration with the fuel cell control system 620. Tabs are used as delimiters. Thus, there is no restriction on the use of white space in the language. The programming language can be loaded to a fuel cell control system 620 dynamically while the fuel cell system 1 is running. The compiler for the programming language compiles the most current control system programming instructions.

The programming language integrates failure detection within its framework. Failure conditions can be specified in the programming language along with specific corrective steps for each failure. Failure detection and correction has priority over normal execution of the program. The failure detection functionality runs independently and at a higher frequency than the state machine execution. In addition, the failure detection functionality is also compiled and loaded independent of the state machine. After failure correction, the program may resume execution of the control system program 640 at any stage. The language syntax will now be described in more detail.

Figure 6:
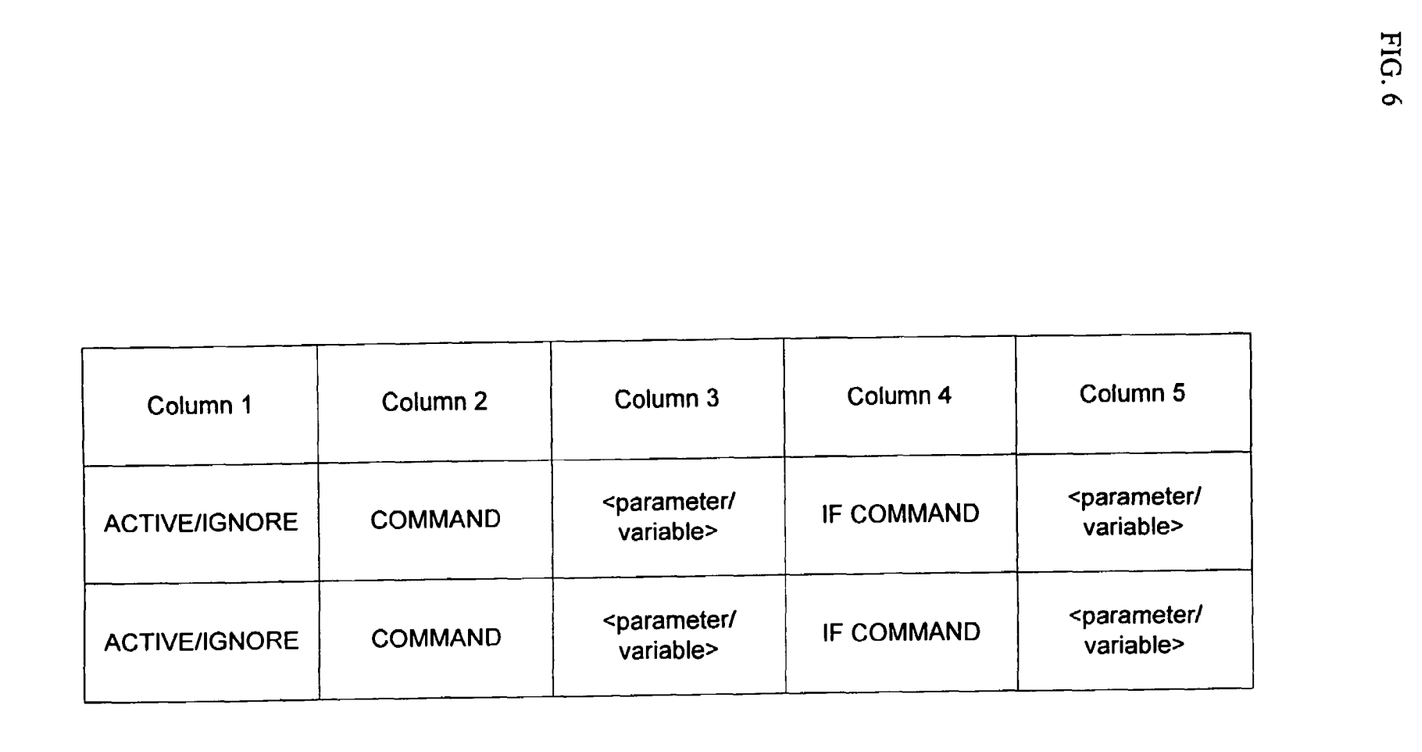
FIG. 6 is a diagram of how the fuel cell control system programming language is implemented according to one embodiment of the invention.

Each row in the spreadsheet file specifies a Condition or Action. According to one embodiment of the invention, as shown in FIG. 6, the programming language uses five columns. In Column 1 only two commands may appear. The ACTIVE command indicates that the row of information is active. The IGNORE command indicates to the compiler to ignore the remaining commands on that row. Next, normal COMMANDS may appear in Column 2. Column 3 is reserved for parameters or variables that the command specified in Column 2 will use. It should be noted that a command may have more than one parameter. In the case of multiple parameters each parameter is placed in a separate column. Finally, IF CONDITIONS are set forth in column 4. Similar to the normal COMMAND, IF CONDITIONS may have parameters which are specified in an adjacent column(s).

Below, for example, is a list of COMMANDS and their associated description and usage:

| COMMAND | DESCRIPTION |
| --- | --- |
| Forward Step | Specifies the next step in the sequence after the current sub-step. Parameter - <Sub-state name from List sub-state names> |
| Compare | Compares values and can be used to create a condition. Parameter - <Compare Name><Defined Compare> |
| End function | Ends function |

Note that according to one embodiment of the invention, the following comparison types are allowed {>, <, =, >=, <=, !=}. In addition the AND, OR and NOT logical operators may be used.

Below, for example, is a list of IF CONDITIONS and their associated description and usage.

| IF CONDITION | DESCRIPTION |
| --- | --- |
| Call | Used to call a function. Parameter <Function name from List function names> |
| Email | Emails information to a specified list of usernames. Parameter <Message> |
| WaitTime(s) | Program execution waits for a specific amount of time before proceeding. Parameter <Wait time in seconds> |

The above-described system has several advantages. The control system program 640 and architecture allow for the detection of failure modes and specifies corrective action for each failure mode. This corrective action may take place while the fuel cell system is still functioning as opposed to having to first shut down the fuel cell and then make corrections. The modular sub-step design of the fuel cell control system program 640 gives a user the ability to easily switch between modes of operation (states) of the fuel cell system. Further, the fuel cell control architecture provides a user with the ability to dynamically change the fuel cell system parameters and logic without shutting down the fuel cell system.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

Related U.S. patent application Ser. No. 11/002,681 is herein incorporated by reference in its entirety.

What is claimed is:

1. A method for controlling a fuel cell system, comprising:
representing an operation of a fuel cell control system as a state machine having one or more states;
controlling the operation of the fuel cell system using the state machine;
executing one or more states of the state machine;
detecting failures in the execution of each of the executed states concurrent with performing the executing step;
pausing an operation of the state machine upon detection of a failure in the fuel cell system control system; and
correcting failures in the fuel cell control system while the fuel cell system continues to generate electricity.

2. The method for controlling a fuel cell system as claimed in claim 1, wherein the representing step further comprises:
entering a series of commands for the operation of a fuel cell system in a first column of a spreadsheet;
inserting at least one parameter for an associated command into a second column of a spreadsheet;
compiling the spreadsheet using a graphical programming application; and
transferring the compiled commands to the fuel cell system for execution.

3. The method for controlling a fuel cell system as claimed in claim 1, wherein the detecting step further comprises:
determining if a specific failure has occurred during execution of the state machine;
executing an operation responsive to the specific failure; and
if the specific failure is a fixable, non-critical failure, resuming execution of the state machine.

4. A computer program embodied in a computer-readable medium, the computer program comprising computer code for:
representing an operation of a fuel cell control system as a state machine having one or more states;
controlling the operation of the fuel cell system using the state machine;
executing one or more states of the state machine;
detecting failures in the execution of each of the executed states concurrent with performing the executing step;
pausing an operation of the state machine upon detection of a failure in the fuel cell system control system; and
correcting failures in the fuel cell control system while the fuel cell system continues to generate electricity.

* * * * *

UNITED STATES PATENT AND TRADEMARK OFFICE
CERTIFICATE OF CORRECTION

PATENT NO. : 7,599,760 B2  Page 1 of 1
APPLICATION NO. : 11/404760
DATED : October 6, 2009
INVENTOR(S) : Dutta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this

Twenty-eighth Day of September, 2010

David J. Kappos
*Director of the United States Patent and Trademark Office*